United States Patent
Liu et al.

(10) Patent No.: US 11,624,530 B2
(45) Date of Patent: Apr. 11, 2023

(54) MEDIUM-DEEP NON-INTERFERENCE GEOTHERMAL HEATING SYSTEM AND METHOD BASED ON LOOSE SILTSTONE GEOLOGY

(71) Applicant: SHAANXI XIXIAN NEW AREA FENGXI NEW CITY ENERGY DEVELOPMENT CO., LTD, Xi'an (CN)

(72) Inventors: Hongtao Liu, Xi'an (CN); Teng Liu, Xi'an (CN); Zhentao Xie, Xi'an (CN); Panfeng Liu, Xi'an (CN)

(73) Assignee: SHAANXI XIXIAN NEW AREA FENGXI NEW CITY ENERGY DEVELOPMENT CO., LTD, Xi'an (CN)

( * ) Notice: Subject to any disclaimer, the term of this patent is extended or adjusted under 35 U.S.C. 154(b) by 0 days.

(21) Appl. No.: 17/527,071

(22) Filed: Nov. 15, 2021

(65) Prior Publication Data
US 2022/0136739 A1 May 5, 2022

Related U.S. Application Data

(63) Continuation of application No. PCT/CN2020/133886, filed on Dec. 4, 2020.

(30) Foreign Application Priority Data

Oct. 29, 2020 (CN) .......................... 202011181331.1

(51) Int. Cl.
F24T 10/17 (2018.01)
F24S 70/20 (2018.01)
F24D 3/18 (2006.01)

(52) U.S. Cl.
CPC ................ F24T 10/17 (2018.05); F24D 3/18 (2013.01); F24S 70/20 (2018.05); *Y02E 10/10* (2013.01)

(58) Field of Classification Search
CPC .. F24T 10/17; F24S 70/20; F24D 3/18; Y02E 10/10
(Continued)

(56) References Cited

U.S. PATENT DOCUMENTS 3,805,885 A * 4/1974 Van Huisen ............ F24T 10/20
165/45
3,857,244 A * 12/1974 Faucette ................. F24T 10/30
165/45

(Continued)

FOREIGN PATENT DOCUMENTS

CN 109931651 A 6/2019
CN 110185429 A 8/2019
(Continued)

*Primary Examiner* — Tho V Duong
(74) *Attorney, Agent, or Firm* — Bayramoglu Law Offices LLC

(57) ABSTRACT

A medium-deep non-interference geothermal heating system based on loose siltstone geology includes a water return pipe and a water inlet pipe. The system further includes a differential pressure overflow pipe, a gauge, a differential pressure controller, a first high area water return pipe, a first water return pipe, a third water return pipe, a bypass pipe, a high area water supply pipe, a second high area water return pipe, a geothermal well water return pipe, a geothermal well water supply pipe, a heat pump unit, a second water return pipe, a water supply pipe, a geothermal well water pump, a first geothermal well water supply pipe, a first geothermal well water return pipe, a second geothermal well water return pipe, a second geothermal well water supply pipe, a geothermal wellhead device, and a geothermal well that are combined for use.

7 Claims, 6 Drawing Sheets

(58) Field of Classification Search
USPC .............................................. 165/45; 62/325
See application file for complete search history.

(56) References Cited

U.S. PATENT DOCUMENTS

| | | | | |
|---|---|---|---|---|
| 4,112,745 A | * | 9/1978 | McCabe ................. | F24T 10/20 |
| | | | | 166/266 |
| 4,157,730 A | * | 6/1979 | Despois .............. | F28D 20/0056 |
| | | | | 165/45 |
| 4,201,060 A | * | 5/1980 | Outmans ................... | F03G 7/04 |
| | | | | 165/45 |
| 4,223,729 A | * | 9/1980 | Foster ..................... | E21B 43/17 |
| | | | | 166/250.1 |
| 2020/0011573 A1 | | 1/2020 | Graham et al. | |

FOREIGN PATENT DOCUMENTS

| | | |
|---|---|---|
| CN | 209818027 U | 12/2019 |
| CN | 210688405 U | 6/2020 |
| CN | 210832163 U | 6/2020 |
| KR | 20180133579 A | 12/2018 |
| KR | 20180135823 A | 12/2018 |
| WO | WO 8002736 A1 * | 12/1980 |

\* cited by examiner

MEDIUM-DEEP NON-INTERFERENCE GEOTHERMAL HEATING SYSTEM AND METHOD BASED ON LOOSE SILTSTONE GEOLOGY

CROSS REFERENCE TO THE RELATED APPLICATIONS

This application is the Continuation Application of International Application No. PCT/CN2020/133886, filed on Dec. 4, 2020, which is based upon and claims priority to Chinese Patent Application No. 202011181331.1, filed on Oct. 29, 2020, the entire contents of which are incorporated herein by reference.

TECHNICAL FIELD

The present invention belongs to the technical field of geothermal heating, in particular to a medium-deep non-interference geothermal heating system and method based on loose siltstone geology.

BACKGROUND

A geothermal heating system refers to a heating system using geothermal energy as the main heat source, where the geothermal energy is renewable energy derived from the earth itself. Moreover, the geothermal heating system is typically divided into the direct heating system and the indirect heating system according to the ways where the geothermal fluid enters into the heating system. Specifically, in the direct heating system, the geothermal fluid is directly introduced into the heating system, and in the indirect heating system, heat energy in the geothermal fluid is conducted to the circulating water of the heating system through a heat exchanger, such that the geothermal fluid does not enter into the heating system directly.

In the design process of existing heat pumps, a compressor is selected first according to the heat load and temperature difference before a heat exchanger is designed, and then the parameters of the heat exchanger are checked by the compressor, so as to determine the equipment size and type of the heat pump. However, such a heat pump unit designed in this way cannot match the temperature of the medium-deep non-interference geothermal heat source, which causes low efficiency of the heat pump unit or even a malfunction of the heat pump unit.

In the construction process of the existing medium-deep non-interference geothermal well based on loose siltstone geological conditions, the geothermal well is likely to collapse in drilling construction due to the loose texture and high water content of the siltstone, and further, the drilling construction may cause infiltration and contamination of shallow groundwater, thereby endangering the safety of drinking water, and restraining the development of geothermal resources to a certain extent.

SUMMARY

The purposes of the present invention are to provide a medium-deep non-interference geothermal heating system and method based on loose siltstone geology having an environmentally friendly advantage and solving problems that a geothermal well is liable to a collapse, infiltration and contamination of shallow groundwater, thereby endangering the safety of drinking water, due to the existing completion technology of non-interference geothermal well based on loose siltstone geological conditions.

In order to achieve the above purposes, the present invention provides the following technical solutions:

The embodiments of the present invention provide a medium-deep non-interference geothermal heating system based on loose siltstone geology, including a water return pipe and a water inlet pipe. A right side of the water return pipe is communicated with a second high area water return pipe, and a right side of the second high area water return pipe is communicated with a first high area water return pipe. A left side of a water inlet pipe is communicated with a gauge, and a right side of the water inlet pipe is communicated with a high area water supply pipe. A differential pressure overflow pipe is configured for communicating the water return pipe with the water inlet pipe and is arranged therebetween. A right side of the first high area water return pipe is communicated with a first water return pipe and a water return pipe, respectively. A side of the water return pipe away from the first high area water return pipe is communicated with a heat pump unit, and a side of the first water return pipe away from the first high area water return pipe is communicated with a bypass pipe. The bottom of the heat pump unit is communicated with a water supply pipe and a second water return pipe, respectively. A side of the water supply pipe away from the heat pump unit is communicated with a first geothermal well water supply pipe, and a side of the second water return pipe away from the heat pump unit is communicated with a first geothermal well water return pipe. A side of the first geothermal well water return pipe away from the second water return pipe is communicated with a second geothermal well water return pipe, and a side of the first geothermal well water supply pipe away from the water supply pipe is communicated with a second geothermal well water supply pipe. A side of the second geothermal well water return pipe away from the first geothermal well water return pipe and a side of the second geothermal well water supply pipe away from the first geothermal well water supply pipe are provided with a geothermal wellhead device. A side of the geothermal wellhead device near the second geothermal well water return pipe and the second geothermal well water supply pipe is communicated with the second geothermal well water return pipe and the second geothermal well water supply pipe. A bottom of the geothermal wellhead device is communicated with a double-pipe heat exchanger arranged in a geothermal well.

In the above solutions, a side of the bypass pipe away from the first water return pipe is communicated with a geothermal well water supply pipe, and a side of the heat pump unit away from the water return pipe is communicated with a geothermal well water return pipe.

In the above solutions, an outside of the second water return pipe is provided with a geothermal well water pump, and a side of the geothermal well water pump near the second water return pipe is communicated with the second water return pipe.

In the above solutions, a left side of the differential pressure overflow pipe is provided with a differential pressure controller, and a side of the differential pressure controller near the differential pressure overflow pipe is communicated with the differential pressure overflow pipe. A side of the high area water supply pipe near the heat pump unit is communicated with the heat pump unit.

In the above solutions, the double-pipe heat exchanger includes an inner pipe and an outer pipe, wherein the outer pipe is sleeved on an outside of the inner pipe, the inner pipe is composed of a plurality of polyethylene (PE) pipes connected in sequence, a first section of the PE pipes is a screen piper, and a counterweight pipe is provided at a bottom of the screen pipe.

In the above solutions, the geothermal well includes an inner casing pipe and an outer casing pipe connected to each other, wherein a polyurethane thermal insulation layer is arranged between the inner casing pipe and the outer casing pipe.

In the above solutions, an outer surface of the inner casing pipe is provided with a solar heat absorbing coating; an inner surface of the outer casing pipe and an inner surface of the inner casing pipe are provided with an anticorrosive coating.

The embodiments of the present invention further provide a construction method for a medium-deep non-interference geothermal heating system based on loose siltstone geology:

step 1: constructing a geothermal well having a double-casing structure, wherein a first casing structure is a cementing section located in a shallow stratum within 500 m below the earth surface and is constructed by drilling with a 347 drill, putting down a φ273 surface casing pipe, and cementing the well with a cement slurry; a second casing structure of 0-2500 m is constructed by putting a φ177 casing pipe down to 2500 m after drilling with a 241 drill;

step 2: putting a double-pipe heat exchanger in the well, wherein an outer pipe of the double-pipe heat exchanger is immediately put down after finishing a drilling of the geothermal well in the double-casing structure, and a solid steel pipe is added as a counterweight at a bottom of a first section of PE pipes in an inner pipe of the double-pipe heat exchanger, to carry out a well-sinking.

In the above solutions, in the step 1, a drilling fluid with specific gravity ≥1.08, funnel viscosity ≥35 s, and leakage ≤15 ml/30 min is injected synchronously during a drilling of the first casing structure in the stratum; a drilling fluid with specific gravity between 1.04-1.06, funnel viscosity between 30-35 s, leakage between 6-10 ml/min, filtrate viscosity between 29-31 s, and salinity between 1-2% is injected before entering a first 10 meters of a collapse-prone stratum during a drilling in an underpressure stratum.

Compared with the prior art, the present invention solves the problems of the shallow groundwater infiltration and contamination which may endanger the safety of drinking water and due to the existing completion technology of non-interference geothermal well based on loose siltstone geological conditions. The present invention is provided with the water return pipe, the differential pressure overflow pipe, the gauge, the water inlet pipe, the differential pressure controller, the first high area water return pipe, the first water return pipe, the water return pipe, the bypass pipe, the high area water supply pipe, the second high area water return pipe, the geothermal well water return pipe, the geothermal well water supply pipe, the heat pump unit, the second water return pipe, the water supply pipe, the geothermal well water pump, the first geothermal well water supply pipe, the first geothermal well water return pipe, the second geothermal well water return pipe, the second geothermal well water supply pipe, the geothermal wellhead device, and the geothermal well that are combined for use.

Figure 1:
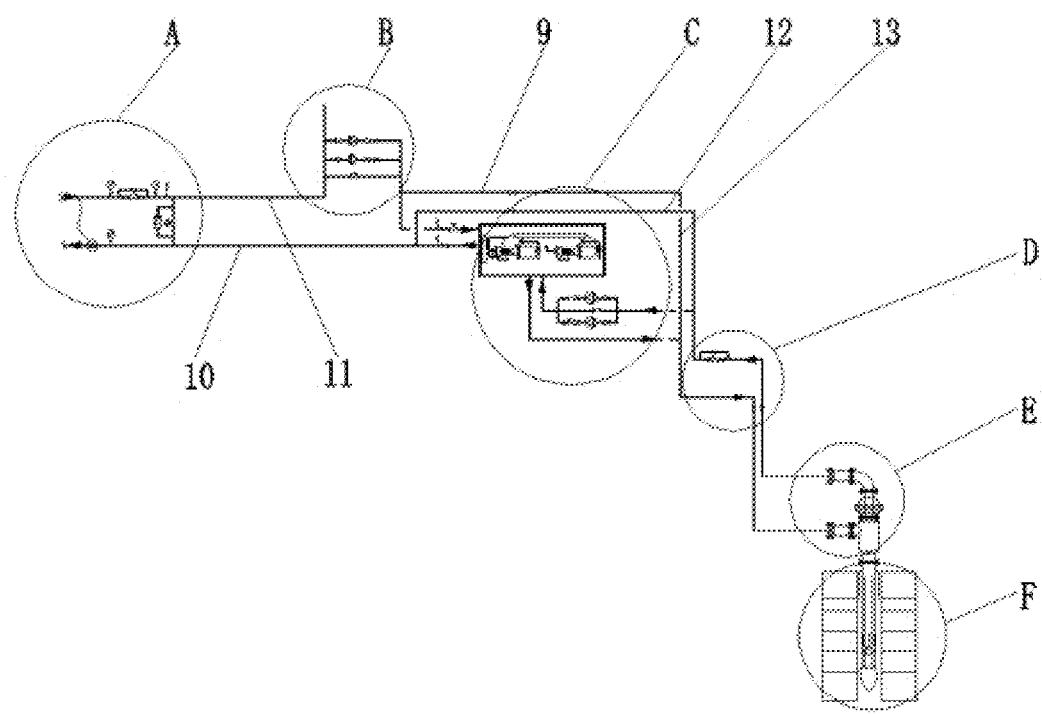
FIG. 1 is a structural schematic diagram of the present invention.

In FIGS: water return pipe 1, differential pressure overflow pipe 2, gauge 3, water inlet pipe 4, differential pressure controller 5, first high area water return pipe 6, first water return pipe 7, water return pipe 8, bypass pipe 9, high area water supply pipe 10, second high area water return pipe 11, geothermal well water return pipe 12, geothermal well water supply pipe 13, heat pump unit 14, second water return pipe 15, water supply pipe 16, geothermal well water pump 17, first geothermal well water supply pipe 18, first geothermal well water return pipe 19, second geothermal well water return pipe 20, second geothermal well water supply pipe 21, geothermal wellhead device 22, geothermal well 23, double-pipe heat exchanger 24.

DETAILED DESCRIPTION OF THE EMBODIMENTS

In combination with the drawings in the embodiments of the present invention, the technical solutions in the embodiments of the present invention will be described clearly and completely. The described embodiments are only part of the embodiments of the present invention, not all embodiments. Based on the embodiments of the present invention, all other embodiments obtained by the ordinary skilled in the art without creative work fall within the scope of the protection of the present invention.

In the description of the present invention, it should be noted that the orientation or position relationship indicated by the terms "upper", "lower", "inner", "outer", "front end", "back end", "two ends", "one end" and "the other end" is based on the orientation or position relationship shown in the drawings, only for the purpose of convenient description of the present invention and simplification of description rather than indicating or implying that the device or elements referred to must have a specific orientation and position, and be constructed and operated in a particular orientation and position, so it cannot be understood as a limitation to the present invention. In addition, the terms "first" and "second" are used only for descriptive purposes and cannot be understood to indicate or imply relative importance.

In the description of the present invention, it should be noted that unless otherwise clearly defined and defined, the terms "installation", "set", "connection", etc., should have a broad meaning, such as "connection", which can be a fixed connection, a detachable connection, or an integrated connection; it can be a mechanical connection or an electrical connection. It can be directly connected or indirectly connected through an intermediary, or it can be the internal communication of the two elements. For the ordinary skilled in the art, the specific meaning of the above terms in the present invention can be understood according to specific situations.

In the present invention, the water return pipe 1, the differential pressure overflow pipe 2, the gauge 3, the water inlet pipe 4, the differential pressure controller 5, the first high area water return pipe 6, the first water return pipe 7, the water return pipe 8, the bypass pipe 9, the high area water supply pipe 10, the second high area water return pipe 11, the geothermal well water return pipe 12, the geothermal well water supply pipe 13, the heat pump unit 14, the second water return pipe 15, the water supply pipe 16, the geothermal well water pump 17, the first geothermal well water supply pipe 18, the first geothermal well water return pipe 19, the second geothermal well water return pipe 20, the second geothermal well water supply pipe 21, the geothermal wellhead device 22, the geothermal well 23, and other components are all general standard components or the components known to the skilled in the art. The structure and principle of the components can be known by the skilled in the art through technical manuals or through conventional experimental methods.

Figure 2:
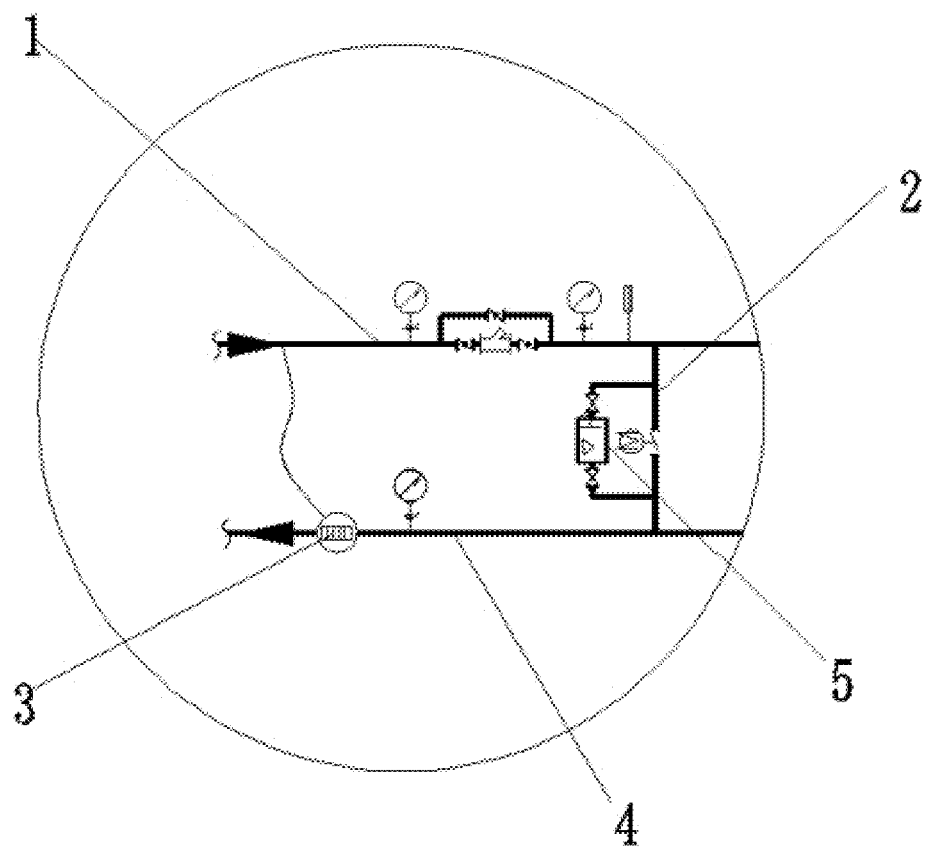
FIG. 2 is a partially enlarged view showing the area A in FIG. 1 of the present invention.
Figure 3:
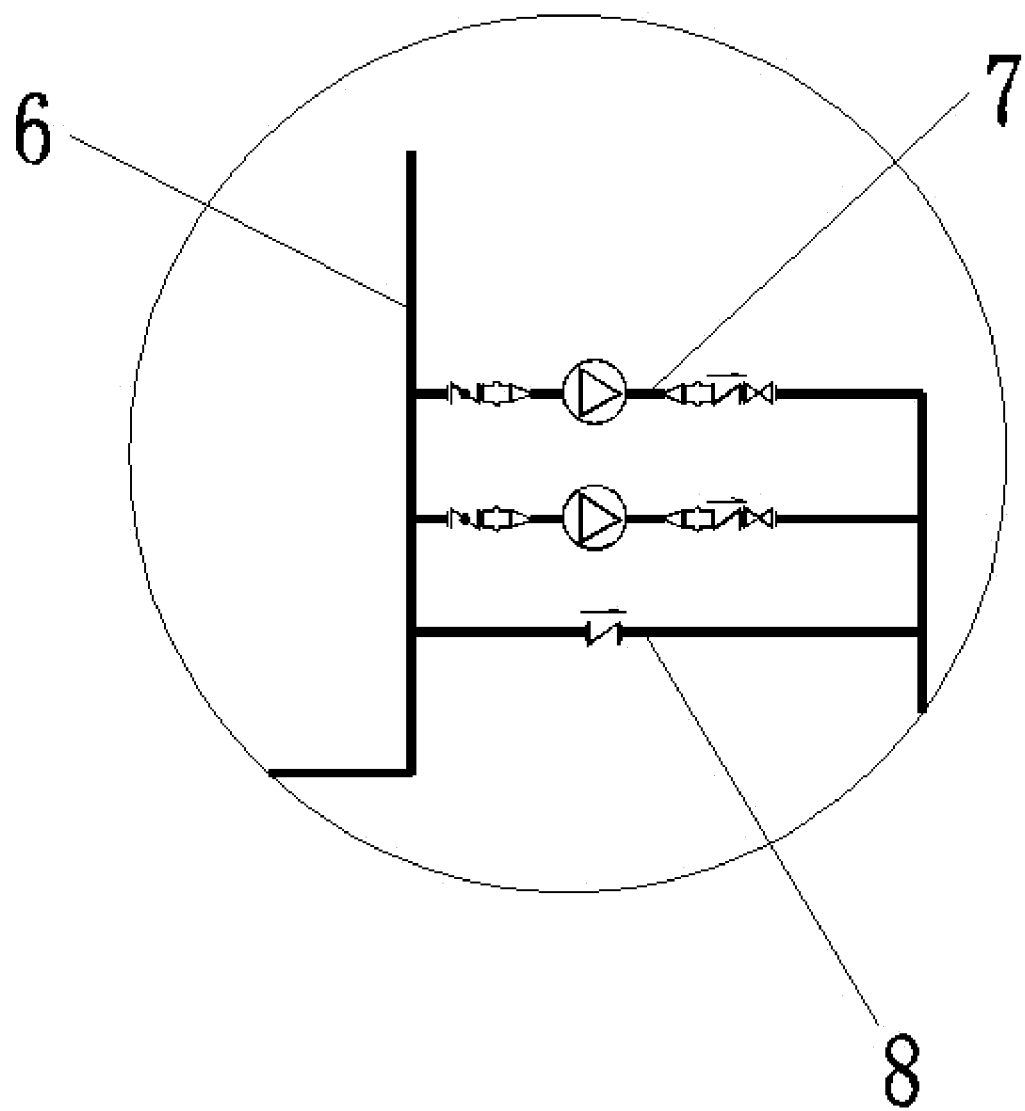
FIG. 3 is a partially enlarged view showing the area B in FIG. 1 of the present invention.
Figure 4:
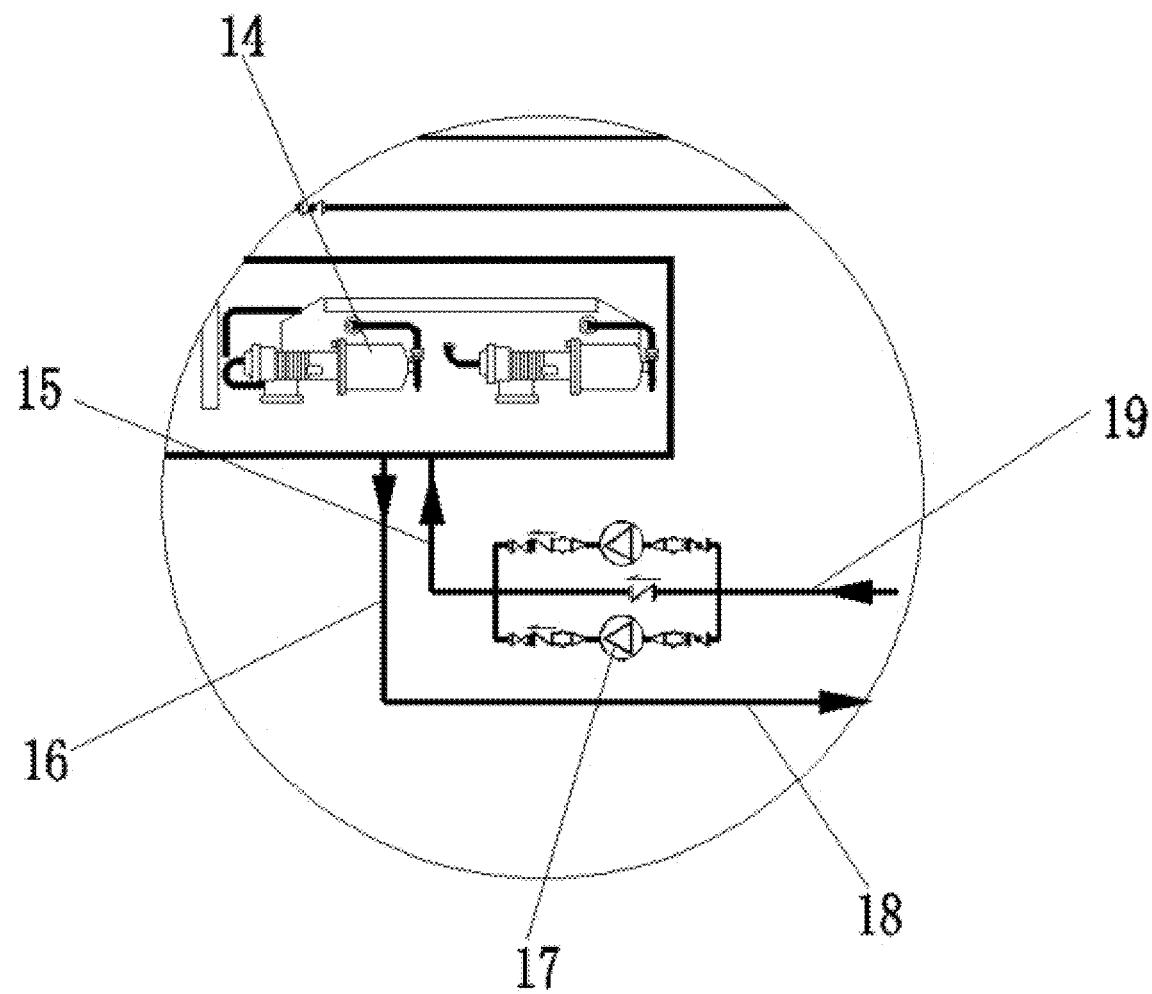
FIG. 4 is a partially enlarged view showing the area C in FIG. 1 of the present invention.
Figure 5:
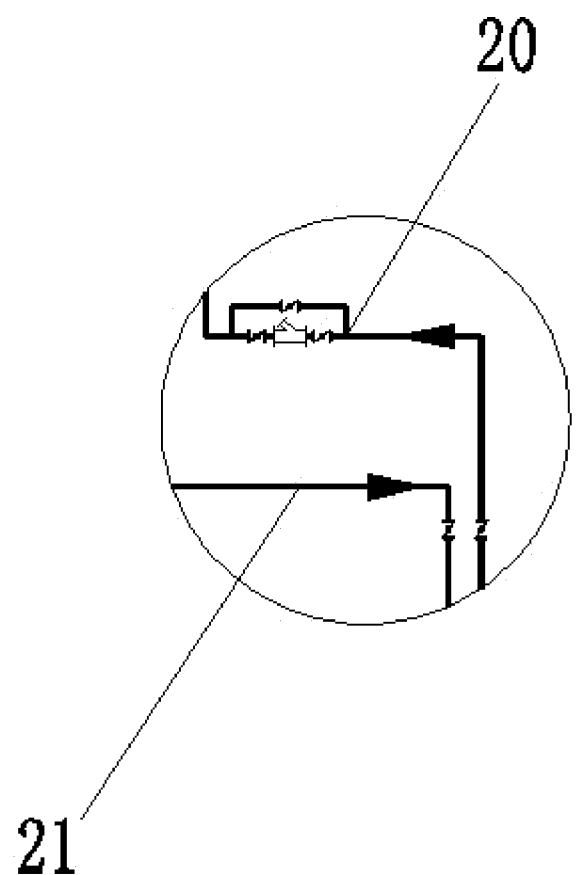
FIG. 5 is a partially enlarged view showing the area D in FIG. 1 of the present invention.
Figure 6:
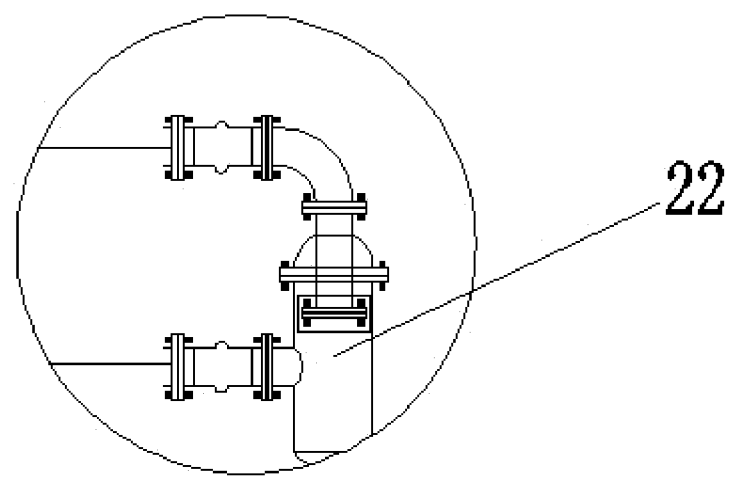
FIG. 6 is a partially enlarged view showing the area E in FIG. 1 of the present invention.
Figure 7:
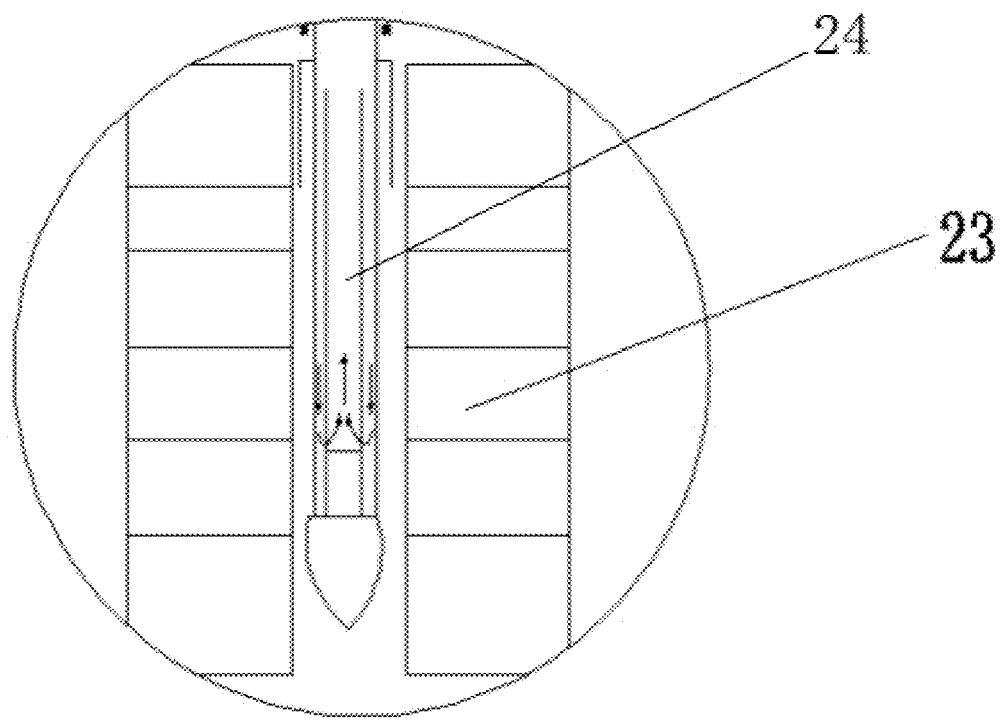
FIG. 7 is a partially enlarged view showing the area F in FIG. 1 of the present invention.

Referring to FIGS. 1 to 7, a medium-deep non-interference geothermal heating system based on loose siltstone geology, including the water return pipe 1 and the water inlet pipe 4. The right side of the water return pipe 1 is communicated with the second high area water return pipe 11, and the right side of the second high area water return pipe 11 is communicated with the first high area water return pipe 6. The left side of the water inlet pipe 4 is communicated with the gauge 3, and the right side of the water inlet pipe 4 is communicated with the high area water supply pipe 10. The differential pressure overflow pipe 2 is configured for communicating the water return pipe 1 with the water inlet pipe 4 and is arranged therebetween. The right side of the first high area water return pipe 6 is communicated with the first water return pipe 7 and the water return pipe 8, respectively. The side of the water return pipe 8 away from the first high area water return pipe 6 is communicated with the heat pump unit 14, and the side of the first water return pipe 7 away from the first high area water return pipe 6 is communicated with the bypass pipe 9. The bottom of the heat pump unit 14 is communicated with the water supply pipe 16 and the second water return pipe 15, respectively. The side of the water supply pipe 16 away from the heat pump unit 14 is communicated with the first geothermal well water supply pipe 18, and the side of the second water return pipe 15 away from the heat pump unit 14 is communicated with the first geothermal well water return pipe 19. The side of the first geothermal well water return pipe 19 away from the second water return pipe 15 is communicated with the second geothermal well water return pipe 20, and the side of the first geothermal well water supply pipe 18 away from the water supply pipe 16 is communicated with the second geothermal well water supply pipe 21. The side of the second geothermal well water return pipe 20 away from the first geothermal well water return pipe 19 and the side of the second geothermal well water supply pipe 21 away from the first geothermal well water supply pipe 18 are provided with the geothermal wellhead device 22. The side of the geothermal wellhead device 22 near the second geothermal well water return pipe 20 and the second geothermal well water supply pipe 21 is communicated with the second geothermal well water return pipe 20 and the second geothermal well water supply pipe 21. The bottom of the geothermal wellhead device 22 is communicated with the double-pipe heat exchanger 24 arranged in the geothermal well 23.

The diameters of the water return pipe 1, the water inlet pipe 4, the first high area water return pipe 6, the bypass pipe 9, the high area water supply pipe 10, the second high area water return pipe 11, the geothermal well water return pipe 12, and the geothermal well water supply pipe 13 are diameter nominal (DN) 300.

The diameters of the differential pressure overflow pipe 2 and the first water return pipe 7 are DN200.

The diameters of the water return pipe 8, the second water return pipe 15, the water supply pipe 16, the first geothermal well water supply pipe 18, the first geothermal well water return pipe 19, the second geothermal well water return pipe 20, and the second geothermal well water supply pipe 21 are DN150.

The side of the bypass pipe 9 away from the first water return pipe 7 is communicated with the geothermal well water supply pipe 13, and the side of the heat pump unit 14 away from the water return pipe 8 is communicated with the geothermal well water return pipe 12.

The outside of the second water return pipe 15 is provided with the geothermal well water pump 17, and the side of the geothermal well water pump 17 near the second water return pipe 15 is communicated with the second water return pipe 15.

The left side of the differential pressure overflow pipe 2 is provided with the differential pressure controller 5, and the side of the differential pressure controller 5 near the differential pressure overflow pipe 2 is communicated with the differential pressure overflow pipe 2. The side of the high area water supply pipe 10 near the heat pump unit 14 is communicated with the heat pump unit 14.

The double-pipe heat exchanger with special material and structure is configured to optimize the downhole working condition related to hydrodynamics, so as to improve the heat transfer efficiency of the double-pipe heat exchanger.

The energy efficiency of the system is significantly improved by setting up the heat pump unit 14 matching the medium-deep geothermal heat transferring features.

In use, the heat pump unit 14 uses the circulating water of the geothermal well 23 as the heat source, and the underground heat energy is exported along with 45° C. hot water to supply the user side transmission and distribution system. The secondary side transmission and distribution system is designed according to 45/35° C., so that the heat source side and the heat pump unit 14 can be matched efficiently in an empirical manner of the heat supply company. Moreover, the system has a bypass system where the user is directly supplied by the geothermal well 23 without the start of the heat pump unit 14, which makes full use of geothermal energy for heating when the geothermal well 23 has a high temperature at the initial stage of heating. The heat pump unit 14 is started for heating when the temperature of the geothermal well 23 drops to the efficient operation range of the heat pump unit 14, so as to achieve the effect of energy cascade utilization.

In summary: in order to solve the problems of the shallow groundwater infiltration and contamination which may endanger the safety of drinking water and due to the existing completion technology of non-interference geothermal well based on loose siltstone geological conditions, the medium-deep non-interference geothermal heating system based on the loose siltstone geology is provided with the water return pipe 1, the differential pressure overflow pipe 2, the gauge 3, the water inlet pipe 4, the differential pressure controller 5, the first high area water return pipe 6, the first water return pipe 7, the water return pipe 8, the bypass pipe 9, the high area water supply pipe 10, the second high area water return pipe 11, the geothermal well water return pipe 12, the geothermal well water supply pipe 13, the heat pump unit 14, the second water return pipe 15, the water supply pipe 16, the geothermal well water pump 17, the first geothermal well water supply pipe 18, the first geothermal well water return pipe 19, the second geothermal well water return pipe 20, the second geothermal well water supply pipe 21, the geothermal wellhead device 22, and the geothermal well 23 that are combined for use.

The double-pipe heat exchanger includes an inner pipe and an outer pipe, specifically, the outer pipe is sleeved on the outside of the inner pipe; the inner pipe is composed of a plurality of sections of polyethylene (PE) pipes connected in sequence where the first section of the PE pipes is a screen piper, and a counterweight pipe is provided at the bottom of the screen pipe.

The geothermal well 23 includes an inner casing pipe and an outer casing pipe connected to each other. A polyurethane thermal insulation layer is arranged between the inner casing pipe and the outer casing pipe to satisfy the requirements of thermal insulation for a long time, and the polyurethane material has excellent wear resistance, aging resistance, and adhesion, which can be applied to the condition of the geothermal well.

The outer surface of the inner casing pipe is provided with a solar heat absorbing coating. Because the inner casing pipe directly touches the water source in the geothermal well, the outer surface has a higher temperature. In this view, the solar heat absorbing coating can better absorb infrared rays to form a heat gathering layer on the outer surface of the inner casing pipe, so as to reduce the heat overflow of the inner casing pipe and further improve the effect of the thermal insulation.

The inner surface of the outer casing pipe and the inner surface of the inner casing pipe are provided with an anticorrosive coating.

The inner casing pipe and the outer casing pipe are all made of petroleum casing pipe. The petroleum casing pipe material can improve the strength of well body structure preventing well collapse, and the excellent corrosion resistance is applicable for the complex water source environment of the geothermal well to prolong the service life of the geothermal well.

The embodiments of the present invention provide a construction method of the medium-deep non-interference geothermal heating system based on the loose siltstone geology, as follows:

Step 1: the geothermal well 23 having a double-casing structure is constructed, wherein a first casing structure is a cementing section located in a shallow stratum within 500 m below the earth surface and is constructed by drilling with a 347 drill, a φ273 surface casing pipe is put down, and the well is cemented with a cement slurry; a second casing structure of 0-2500 m is constructed by putting a φ177 casing pipe down to 2500 m after drilling with a 241 drill.

Specifically, in the step 1, a drilling fluid with specific gravity ≥1.08, funnel viscosity ≥35 s, and leakage ≤15 ml/30 min is injected synchronously during a drilling of the first casing structure in the stratum; a drilling fluid with specific gravity between 1.04-1.06, funnel viscosity between 30-35 s, leakage between 6-10 ml/min, filtrate viscosity between 29-31 s, and salinity between 1-2% is injected before entering a first 10 meters of a collapse-prone stratum during a drilling in an underpressure stratum.

The use of the double-casing well deep structure can effectively separate and block the shallow groundwater layer to prevent the infiltration and contamination of the groundwater.

Step 2: a double-pipe heat exchanger is put in the well, wherein an outer pipe of the double-pipe heat exchanger is immediately put down after a drilling of the geothermal well 23 in the double-casing structure is finished, and a solid steel pipe is added as a counterweight at a bottom of a first section of PE pipes in an inner pipe of the double-pipe heat exchanger, to carry out a well-sinking.

For the ordinary skilled in the art, although the embodiments of the present invention have been shown and described, it is understandable that a variety of changes, modifications, replacements, and variants can be made to these embodiments without departing from the principle and spirit of the present invention, and the scope of the present invention is limited by the attached claims and the equivalents thereof.

What is claimed is:

1. A medium-deep non-interference geothermal heating system based on loose siltstone geology, comprising a first water return pipe and a water inlet pipe, wherein
   a right side of the first water return pipe is communicated with a second high area water return pipe, and a right side of the second high area water return pipe is communicated with a first high area water return pipe;
   a left side of the water inlet pipe is communicated with a gauge, and a right side of the water inlet pipe is communicated with a high area water supply pipe;
   a differential pressure overflow pipe is configured for communicating the first water return pipe with the water inlet pipe and is arranged between the first water return pipe and the water inlet pipe;
   a right side of the first high area water return pipe is communicated with a second water return pipe and a third water return pipe, respectively;
   a side of the third water return pipe away from the first high area water return pipe is communicated with a heat pump unit, and a side of the second water return pipe away from the first high area water return pipe is communicated with a bypass pipe;
   a bottom of the heat pump unit is communicated with a water supply pipe and a fourth water return pipe, respectively;
   a side of the water supply pipe away from the heat pump unit is communicated with a first geothermal well water supply pipe, and a side of the fourth water return pipe away from the heat pump unit is communicated with a first geothermal well water return pipe;
   a side of the first geothermal well water return pipe away from the fourth water return pipe is communicated with a second geothermal well water return pipe, and a side of the first geothermal well water supply pipe away from the water supply pipe is communicated with a second geothermal well water supply pipe;
   a side of the second geothermal well water return pipe away from the first geothermal well water return pipe and a side of the second geothermal well water supply pipe away from the first geothermal well water supply pipe are provided with a geothermal wellhead device;
   a side of the geothermal wellhead device near the second geothermal well water return pipe and the second geothermal well water supply pipe is communicated with the second geothermal well water return pipe and the second geothermal well water supply pipe; and
   a bottom of the geothermal wellhead device is communicated with a double-pipe heat exchanger arranged in a geothermal well.

2. The medium-deep non-interference geothermal heating system based on the loose siltstone geology according to claim 1, wherein a side of the bypass pipe away from the second water return pipe is communicated with a geothermal well water supply pipe, and a side of the heat pump unit away from the third water return pipe is communicated with a geothermal well water return pipe.

3. The medium-deep non-interference geothermal heating system based on the loose siltstone geology according to claim 2, wherein an outside of the fourth water return pipe is provided with a geothermal well water pump, and a side of the geothermal well water pump is near the fourth water return pipe and communicated with the fourth water return pipe.

4. The medium-deep non-interference geothermal heating system based on the loose siltstone geology according to claim 3, wherein a left side of the differential pressure overflow pipe is provided with a differential pressure controller, and a side of the differential pressure controller near the differential pressure overflow pipe is communicated with the differential pressure overflow pipe; a side of the high area water supply pipe near the heat pump unit is communicated with the heat pump unit.

5. The medium-deep non-interference geothermal heating system based on the loose siltstone geology according to claim 4, wherein the double-pipe heat exchanger comprises an inner pipe and an outer pipe, wherein the outer pipe is sleeved on an outside of the inner pipe, wherein the inner pipe comprises a plurality of polyethylene (PE) pipes connected in sequence, wherein a first section of the PE pipes is a screen piper, and a counterweight pipe is provided at a bottom of the screen pipe.

6. The medium-deep non-interference geothermal heating system based on the loose siltstone geology according to claim 5, wherein the geothermal well comprises an inner casing pipe and an outer casing pipe connected to each other, wherein a polyurethane thermal insulation layer is arranged between the inner casing pipe and the outer casing pipe.

7. The medium-deep non-interference geothermal heating system based on the loose siltstone geology according to claim 6, wherein an outer surface of the inner casing pipe is provided with a solar heat absorbing coating; an inner surface of the outer casing pipe and an inner surface of the inner casing pipe are provided with an anticorrosive coating.

* * * * *